US011196499B2

(12) United States Patent
Arai et al.

(10) Patent No.: US 11,196,499 B2
(45) Date of Patent: Dec. 7, 2021

(54) TIME SYNCHRONIZATION DEVICE AND TIME SYNCHRONIZATION METHOD

(71) Applicant: Nippon Telegraph and Telephone Corporation, Tokyo (JP)

(72) Inventors: Kaoru Arai, Tokyo (JP); Hiroki Sakuma, Tokyo (JP); Takaaki Hisashima, Tokyo (JP); Ryuta Sugiyama, Tokyo (JP); Shunichi Tsuboi, Tokyo (JP); Osamu Kurokawa, Tokyo (JP); Kazuyuki Matsumura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/979,767

(22) PCT Filed: Mar. 4, 2019

(86) PCT No.: PCT/JP2019/008415
§ 371 (c)(1),
(2) Date: Sep. 10, 2020

(87) PCT Pub. No.: WO2019/176619
PCT Pub. Date: Sep. 19, 2019

(65) Prior Publication Data
US 2021/0021362 A1   Jan. 21, 2021

(30) Foreign Application Priority Data

Mar. 12, 2018   (JP) .............................. JP2018-044722

(51) Int. Cl.
*H04J 3/06* (2006.01)
*H04L 12/24* (2006.01)
*G04G 5/00* (2013.01)

(52) U.S. Cl.
CPC .......... *H04J 3/0673* (2013.01); *H04J 3/0644* (2013.01); *H04J 3/0667* (2013.01);
(Continued)

(58) Field of Classification Search
CPC ...... H04J 3/0673; H04J 3/0644; H04J 3/0641; H04J 3/0667; H04L 41/0654; H04L 41/0668; G04G 7/00
See application file for complete search history.

(56) References Cited

U.S. PATENT DOCUMENTS 8,416,763 B1 * 4/2013 Montini ................ H04J 3/0667
370/350
2002/0191538 A1 * 12/2002 Ono ..................... H04J 14/0241
370/222

(Continued)

OTHER PUBLICATIONS

Tipper et al., "A Survey of Clock Synchronization Over Packet-Switched Networks", IEEE, 2016 (Year: 2016).*

(Continued)

*Primary Examiner* — Omer S Mian
(74) *Attorney, Agent, or Firm* — Fish & Richardson P.C.

(57) ABSTRACT

[Problem] It is possible to improve the quality of time information by suppressing a jump in time which arises when switching a transfer path in a BC apparatus to which transfer paths of time information of at least 2 systems are connected to an input side.
[Solution] A time synchronization apparatus 20 is mounted on a BC apparatus 12c in which two systems of at least a 0-system route (0-system) and a 1-system route (1-system) are connected to an input side, and includes a time correction value holding unit 26 configured to hold a 0-system correction value in which a time error resulting from delay of UTC due to performance inherent to the BC apparatus is the same value as a time error accumulated on the 0-system side and a 1-system correction value in which the time error is the same value as a time error accumulated on the 1-system side. Further, a failure restoration detection unit 23 configured to detect a failure in the 0-system or the 1-system, a time calculation unit 24 configured to perform correction by (Continued)

subtracting a 1-system correction value relating to a normal 1-system from UTC having time error accumulated on the normal 1-system side, when a failure in the 0-system is detected, and a path switching unit 25 configured to switch to the normal 1-system side such that the UTC after correction is transferred, when the failure is detected, are included.

11 Claims, 10 Drawing Sheets

(52) U.S. Cl.
CPC ...... *H04L 41/0654* (2013.01); *H04L 41/0668* (2013.01); *G04G 5/00* (2013.01); *H04J 3/0641* (2013.01)

(56) References Cited

U.S. PATENT DOCUMENTS

| | | | |
|---|---|---|---|
| 2015/0249514 A1* | 9/2015 | Le Pallec et al. .... | H04J 3/0664 370/216 |
| 2019/0253170 A1* | 8/2019 | Farra ................. | H04W 56/0045 |
| 2020/0119826 A1* | 4/2020 | Neugeboren ......... | H04J 3/0688 |

OTHER PUBLICATIONS

Shpiner et al, "Multi-Path Time Protocols", IEEE, 2013 (Year: 2013).*

[No Author Listed]. "IEEE Standard for a Precision Clock Synchronization Protocol for Networked Measurement and Control Systems," IEEE, Jul. 24, 2008, 290 pages.

* cited by examiner

TIME SYNCHRONIZATION DEVICE AND TIME SYNCHRONIZATION METHOD

CROSS-REFERENCE TO RELATED APPLICATIONS

This application is a National Stage application under 35 U.S.C. § 371 of International Application No. PCT/JP2019/008415, having an International Filing Date of Mar. 4, 2019, which claims priority to Japanese Application Serial No. 2018-044722, filed on Mar. 12, 2018. The disclosure of the prior application is considered part of the disclosure of this application, and is incorporated in its entirety into this application.

TECHNICAL FIELD

The present disclosure relates to a time synchronization apparatus and a time synchronization method for transferring time information between a Grand Master Clock (GM) apparatus that receives time information from a Global Positioning System (GPS) and a plurality of Boundary Clock (BC) apparatuses that are connected to a network, and accurately performing time synchronization.

BACKGROUND ART

In recent years, the demand for communication systems and communication services that require highly accurate and highly reliable time synchronization has been increasing. As a method for realizing highly accurate time synchronization, in general, there is a method of receiving time information from a GPS by a GM apparatus as a master apparatus, and transferring the received time information to BC apparatuses as slave apparatuses by using a Precision Time Protocol (PTP) described later. PTP is the protocol for synchronizing the time of a communication apparatus in a network with high accuracy. In this PTP, a PTP packet containing time information is exchanged between a GM apparatus and a BC apparatus facing each other, so that the time of the BC apparatus is corrected to the time of the GM apparatus to achieve time synchronization.

FIG. 9 is a block diagram of a network (NW) system 10 having a GM apparatus and a plurality of BC apparatuses. The NW system 10 includes a GM apparatus 11, a plurality of BC apparatuses 12a to 12c, and an end application (EA) apparatus 13 which requires highly accurate time synchronization. The GM apparatus 11 is a Global Navigation Satellite System (GNSS) receiver that receives Coordinated universal time (UTC) as time information. The EA apparatus 13 is a BC apparatus. The GM apparatus 11, the plurality of BC apparatuses 12a to 12c, and the EA apparatus 13 are connected by an NW such as an optical fiber.

In the NW system 10, a user's main signal packet P2 is superimposed on a PTP packet P1 including UTC as time information from the GM apparatus 11, and transferred between the GM apparatus 11 and the plurality of BC apparatuses 12a to 12c. The superimposed PTP packet P1 and main signal packet P2 are transferred from the BC apparatus 12c to the EA apparatus 13.

In the NW system 10, the PTP packet P1 can be transferred from one GM apparatus 11 to the plurality of BC apparatuses 12a to 12c and the EA apparatus 13 via the NW, so that a plurality of the GM apparatuses are not required. Further, the main signal packet P2 from the user is superimposed on the PTP packet P1, and both can be transferred simultaneously. For these reasons, an economical NW system 10 can be realized. Further, the transfer path can be duplicated by using a two-core optical fiber or the like, the reliability can be improved. As this type of technique, there is a technique described in Non-Patent literature 1.

CITATION LIST

Non Patent Literature

Non-Patent Literature 1: "IEEE Standard for a Precision Clock Synchronization Protocol for Networked Measurement and Control Systems", IEEE Std 1588TM-2008

SUMMARY OF THE INVENTION

Technical Problem

However, the above-described NW system 10 has the following problem. For example, as illustrated in FIG. 10, the NW system 10 has a ring configuration in which starting from a BC apparatus 12a that receives the UTC of the time information from the GM apparatus 11, BC apparatuses 12b, 12c, 12d, 12e, 12f, and 12g are sequentially connected by an optical fiber, and the connection end is connected back to the BC apparatus 12a. Further, the BC apparatus 12c is connected to the BC apparatus 13, which is an EA apparatus.

In this configuration, from the starting BC apparatus 12a to the BC apparatus 12c connected to the ending BC apparatus 13, a PTP packet (also referred to as a packet) P1 including UTC is transferred via a 0-system route (a 0-system transfer path by an optical fiber) R0 indicated by an arrow R0 and a 1-system route (a 1-system transfer path by an optical fiber) R1 indicated by an arrow R1, which are opposite in direction. At this time, in each of the BC apparatuses 12a to 12g, a time error (for example, 20 ns) resulting from delay of the packet P1 due to the performance inherent to the BC apparatus.

The time error is a Constant Time Error (cTE) as a static synchronization error. The cTE can be predicted during operation by preliminary measurement. In addition, the time error includes a Dynamic Time Error (dTE) that dynamically changes due to fluctuations of the PTP packet in the transfer path. The dTE is a temporal variation, and it is difficult to know the dTE during operation based on the result of the preliminary measurement, and thus, it is omitted in the description of the present invention. Consequently, a time error such as +20 ns illustrated in FIG. 10 indicates cTE. Note that the time error of cTE is also simply referred to as an error.

In the BC apparatus 12a, in the 0-system route R0, when the packet P1 including the UTC received from the GM apparatus 11 is output, the packet P1 in which the UTC of the time information is delayed by 20 ns (expressed as UTC+20 ns) is output. Thereafter, a delay of 20 ns occurs for each BC apparatus, so that the BC apparatus 12b outputs a packet P1 of UTC+40 ns, and the BC apparatus 12c outputs a packet P1 of UTC+60 ns.

Similarly, in the 1-system route R1, packets P1 of UTC+40 ns, UTC+60 ns, UTC+80 ns, UTC+100 ns, and UTC+120 ns are output from the BC apparatus 12g, the BC apparatus 12f, the BC apparatus 12e, the BC apparatus 12d, and the BC apparatus 12c, respectively.

At this time, it is assumed that in the BC apparatus 12c in which the 0-system route R0 and the 1-system route R1 are connected to the input side, the 0-system route R0 is selected and the packet P1 is output. Here, it is assumed that a failure has occurred in the 0-system route R0. Upon detecting the failure, the BC apparatus 12c switches from the failed 0-system route R1 to the normal 1-system route at time t21 illustrated on the horizontal axis in FIG. 11.

At the time of switching by the BC apparatus 12c, the accumulated time information is different in the 0-system route R0 and the 1-system route R1 as +60 ns and +120 ns, so that a jump in time occurs at which the error 60 ns of the 0 system route R1 jumps to the error 120 ns of the 1 system route R1, indicated by Time Error (TE) on the vertical axis in FIG. 11. That is, the jump in time occurs due to a time error. When the jump in time occurs, there arises a problem that the quality of the time information transferred in the packet P1 from the BC apparatus 12c to the BC apparatus 13 deteriorates.

The present disclosure has been made in view of such circumstances, and an object is to provide a time synchronization apparatus and a time synchronization method, which improve the quality of time information by suppressing a jump in time which arises when switching a transfer path in a BC apparatus to which transfer paths of time information of at least 2 systems are connected to an input side.

Means for Solving the Problem

As a means for solving the above-described problems, the invention according to claim 1 is a time synchronization apparatus for performing time synchronization by transferring Coordinated universal time (UTC) transmitted from a Grand master clock (GM) apparatus, which receives the UTC as time information, via a plurality of Boundary Clock (BC) apparatuses connected by a transfer path and correcting time of the BC apparatus to time of the GM apparatus, the time synchronization apparatus being mounted on a specific BC apparatus, among the plurality of BC apparatuses, in which time information transfer paths of at least two systems of a 0-system and a 1-system having different transfer delays are connected to an input side, the time synchronization apparatus including: a holding unit configured to hold a 0-system correction value in which a time error resulting from delay of the UTC due to performance inherent to the BC apparatus is the same value as a time error accumulated on a transfer path side of the 0-system and hold a 1-system correction value in which the time error is the same value as a time error accumulated on a transfer path side of the 1-system; a detection unit configured to detect a failure in the transfer path of the 0-system or the 1-system; a correction unit configured to perform correction by subtracting the 0-system correction value or the 1-system correction value relating to a normal transfer path from the UTC having the time error accumulated on a normal transfer path side, when the failure is detected; and a switching unit configured to switch to the normal transfer path side such that the UTC obtained by the correction is transferred, when the failure is detected.

The invention according to claim 8 is a time synchronization method by a time synchronization apparatus for performing time synchronization by transferring UTC transmitted from a GM apparatus, which receives the UTC as time information, via a plurality of BC apparatuses connected by a transfer path and correcting time of the BC apparatus to time of the GM apparatus, the time synchronization apparatus being mounted on a specific BC apparatus, among the plurality of BC apparatuses, in which time information transfer paths of at least two systems of a 0-system and a 1-system having different transfer delays are connected to an input side, and including a holding unit configured to hold a 0-system correction value in which a time error resulting from delay of the UTC due to performance inherent to the BC apparatus is the same value as a time error accumulated on a transfer path side of the 0-system and hold a 1-system correction value in which the time error is the same value as a time error accumulated on a transfer path side of the 1-system, the time synchronization method including: detecting a failure in the transfer path of the 0-system or the 1-system; performing correction by subtracting the 0-system correction value or the 1-system correction value relating to a normal transfer path from the UTC having the time error accumulated on a normal transfer path side, when the failure is detected; and switching to the normal transfer path side such that the UTC obtained by the correction is transferred, when the failure is detected.

According to the configuration of claim 1 and the method of claim 8, when switching to the normal transfer path, the time information input after correction in the normal transfer path after the switching is only the UTC resulting from the subtraction of the 0-system correction value or 1-system correction value from the time error accumulated in the normal transfer path. As described above, the time information to be transferred via the failed transfer path before the switching is only the UTC resulting from the correction in the same manner as described above. Thus, the time information transmitted via the transfer path after the switching becomes the same time information as only the UTC transferred via the transfer path before the switching, and there is no difference due to the time error between before and after the switching. Thus, when switching from the failed transfer path to the normal transfer path, there is no jump in time in which time jumps due to the difference caused by the time error. Thus, the quality of the time information does not deteriorate, and the quality of the time information can be improved.

The invention according to claim 2 is the time synchronization apparatus, wherein the detection unit detects restoration of a failure of the transfer path of the 0-system or the 1-system, the correction unit performs correction by subtracting the 0-system correction value or the 1-system correction value relating to a restored transfer path from the UTC having the time error accumulated on the transfer path side for which restoration is detected, and the switching unit performs a process of switching back to the transfer path for which the restoration is detected such that the UTC obtained by the correction is transferred.

According to this configuration, when the failed transfer path is restored after switching to a normal transfer path due to a failure in the transfer path, it is possible to switch back to the restored transfer path without a jump in time. Thus, the quality of the time information does not deteriorate at the time of switching back, so that the quality of the time information can be improved.

The invention according to claim 3 is the time synchronization apparatus according to claim 1 or 2, wherein the switching unit has a first function of detecting occurrence of a jump in time, when the jump in time which is a difference between before switching and after switching due to a time error occurs on the transfer path after switching, in a case where the switching unit performs switching to a normal transfer path when the failure is detected, and the correction unit has a second function of performing a process of reducing a time error of the UTC transferred on a transfer path after switching within a predetermined time such that the difference becomes 0, when the occurrence of the jump in time is detected.

According to this configuration, when the jump in time occurs when the transfer path is switched, the time error (for example, the time error 120 ns) of the UTC to be transferred via the transfer path after the switching is reduced within a predetermined time (gradually) such that the difference, due to the time error, between before the switching and after the switching becomes 0. By gradually reducing the time error 120 ns to 0 within the predetermined time in this way, the effect of the change in the time error on the downstream BC apparatus does not occur transiently, which suppresses an adverse effect on quality of time information of the BC apparatus.

The invention according to claim 4 is the time synchronization apparatus according to any one of claims 1 to 3, wherein the time synchronization apparatus is mounted on a specific BC apparatus, among the plurality of BC apparatuses, in which time information transfer paths of at least two systems of a 0-system and a 1-system having different transfer delays are connected to an input side and the time information transfer paths of at least two systems of a 0-system and a 1-system are connected to an output side; and the switching unit performs switching such that the UTC obtained by the correction performed by the correction unit is transferred to the transfer paths of the two systems on the output side of the specific BC apparatus, when the failure is detected by the detection unit.

According to this configuration, even when the downstream side of the BC apparatus to which at least two routes R0 and R1 of both the 0-system and the 1-system are input from the upstream side has at least two branches, at the time of the failure of any one of the transfer paths, time information of a normal transfer path can be transferred to both of the two branched transfer paths on the downstream side.

The invention according to claim 5 is a time synchronization apparatus for performing time synchronization by transferring UTC transferred from a GM apparatus, which receives the UTC as time information, via a plurality of BC apparatuses connected by a transfer path and correcting time of the BC apparatus to time of the GM apparatus, the time synchronization apparatus being mounted on a specific BC apparatus, among the plurality of BC apparatuses, in which time information transfer paths of at least two systems of a 0-system and a 1-system having different transfer delays are connected to an input side, the time synchronization apparatus including: a 0-system holding unit configured to hold a 0-system correction value in which a time error resulting from delay of the UTC due to performance inherent to the BC apparatus is the same value as a time error accumulated on the transfer path side of the 0-system; a 1-system holding unit configured to hold a 1-system correction value in which the time error is the same value as a time error accumulated on a transfer path side of the 1-system; a 0-system detection unit configured to detect a failure in the transfer path of the 0-system; a 1-system detection unit configured to detect a failure in the transfer path of the 1-system; a 0-system correction unit configured to perform correction by subtracting the 0-system correction value from the UTC having the time error accumulated on a transfer path side of the 0-system; a 1-system correction unit configured to perform correction by subtracting the 1-system correction value from the UTC having the time error accumulated on the transfer path side of the 1-system; a 0-system switching unit configured to perform switching to stop transfer of time information on the transfer path of the 0-system when the 0-system detection unit detects a failure, and start transfer of time information on the transfer path of the 0-system when the 1-system detection unit detects a failure; and a 1-system switching unit configured to perform switching to start transfer of time information on the transfer path of the 1-system when the 1-system detection unit detects a failure, and stop transfer of time information on the transfer path of the 1-system when the 1-system detection unit detects a failure.

According to this configuration, the time synchronization apparatus is configured by providing components including the holding unit, the detection unit, the correction unit, and the switching unit separately for the 0-system and the 1-system. Thus, even when one of the components of the system 0 or 1 fails, the time synchronization process can be normally executed by the other normal component.

The invention according to claim 6 is the time synchronization apparatus according to claim 5, wherein the 0-system detection unit detects restoration of a failure in the transfer path of the 0-system, the 1-system detection unit detects restoration of a failure in the transfer path of the 1-system, the 0-system switching unit performs a process of switching back to the transfer path of the 0-system when the restoration of the transfer path of the 0-system is detected, and the 1-system switching unit performs a process of switching back to the transfer path of the 1-system when the restoration of the transfer path of the 1-system is detected.

According to this configuration, when the failed transfer path is restored after switching to the normal transfer path due to the failure of the transfer path, the time error of the time information to be transferred via the restored transfer path is inevitably corrected by the correction unit. Thus, for example, when restoration of the transfer path of the 0-system is detected, in a case where a process of switching back to the transfer path of the 0-system is performed, the 0-system switching unit can perform switching back to the restored system transfer path without time jump. Consequently, the quality of the time information does not deteriorate at the time of the switching back, so that the quality of the time information can be improved.

The invention according to claim 7 is the time synchronization apparatus according to any one of claims 4 to 6, wherein the time synchronization apparatus is mounted on a specific BC apparatus, among the plurality of BC apparatuses, in which time information transfer paths of at least two systems of a 0-system and a 1-system having different transfer delays are connected to an input side and the time information transfer paths of at least two systems of a 0-system and a 1-system are connected to an output side; when the 0-system detection unit detects a failure, the 0-system switching unit stops transfer of time information on the transfer path of the 0-system and the 1-system switching unit performs switching such that the UTC of the transfer path of the 1-system is transferred to the transfer paths of the two systems on the output side of the specific BC apparatus; and when the 1-system detection unit detects a failure, the 1-system switching unit stops transfer of time information on the transfer path of the 1-system and the 0-system switching unit performs switching such that the UTC of the transfer path of the 0-system is transferred to the transfer paths of the two systems on the output side of the specific BC apparatus.

According to this configuration, even when the downstream side of the BC apparatus to which at least two routes R0 and R1 of both the 0-system and the 1-system are input from the upstream side has at least two branches, at the time of the failure of any one of the transfer paths, time information of a normal transfer path can be transferred to both of the two branched transfer paths on the downstream side. Further, even when one of the components of the system 0 or 1 fails, the time synchronization process can be normally executed by the other normal component.

Effects of the Invention

According to the present disclosure, it is possible to provide a time synchronization apparatus and a time synchronization method, which improve the quality of time information by suppressing a jump in time which arises when switching a transfer path in a BC apparatus to which transfer paths of time information of at least 2 systems are connected to an input side.

DESCRIPTION OF EMBODIMENTS

Hereinafter, embodiments of the present disclosure will be described with reference to the drawings.
Configuration of First Embodiment FIG. 1 is a block diagram illustrating a configuration of a time synchronization apparatus according to a first embodiment of the present disclosure.

Figure 1:
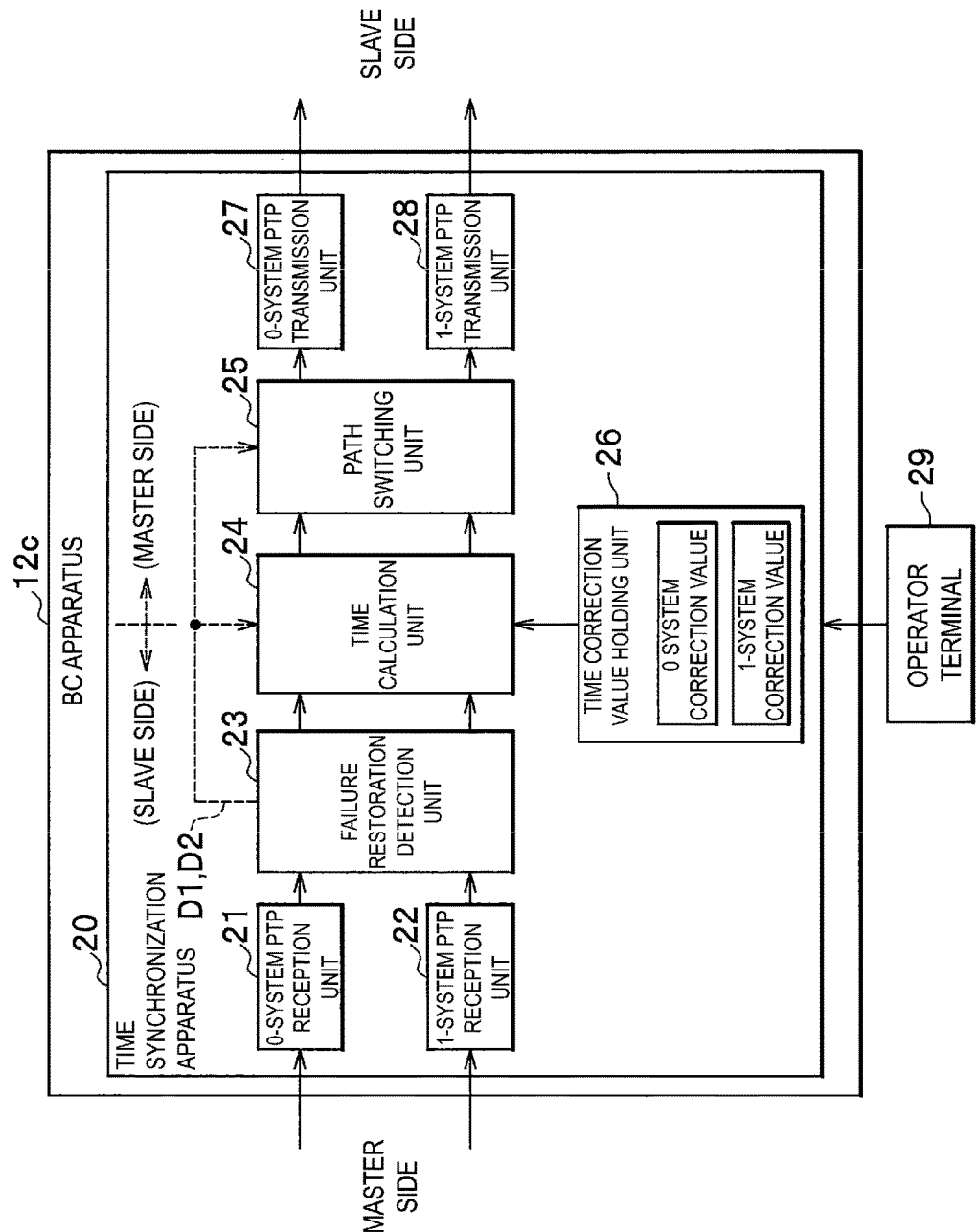
FIG. 1 is a block diagram illustrating a configuration of a time synchronization apparatus according to a first embodiment of the present disclosure.
Figure 10:
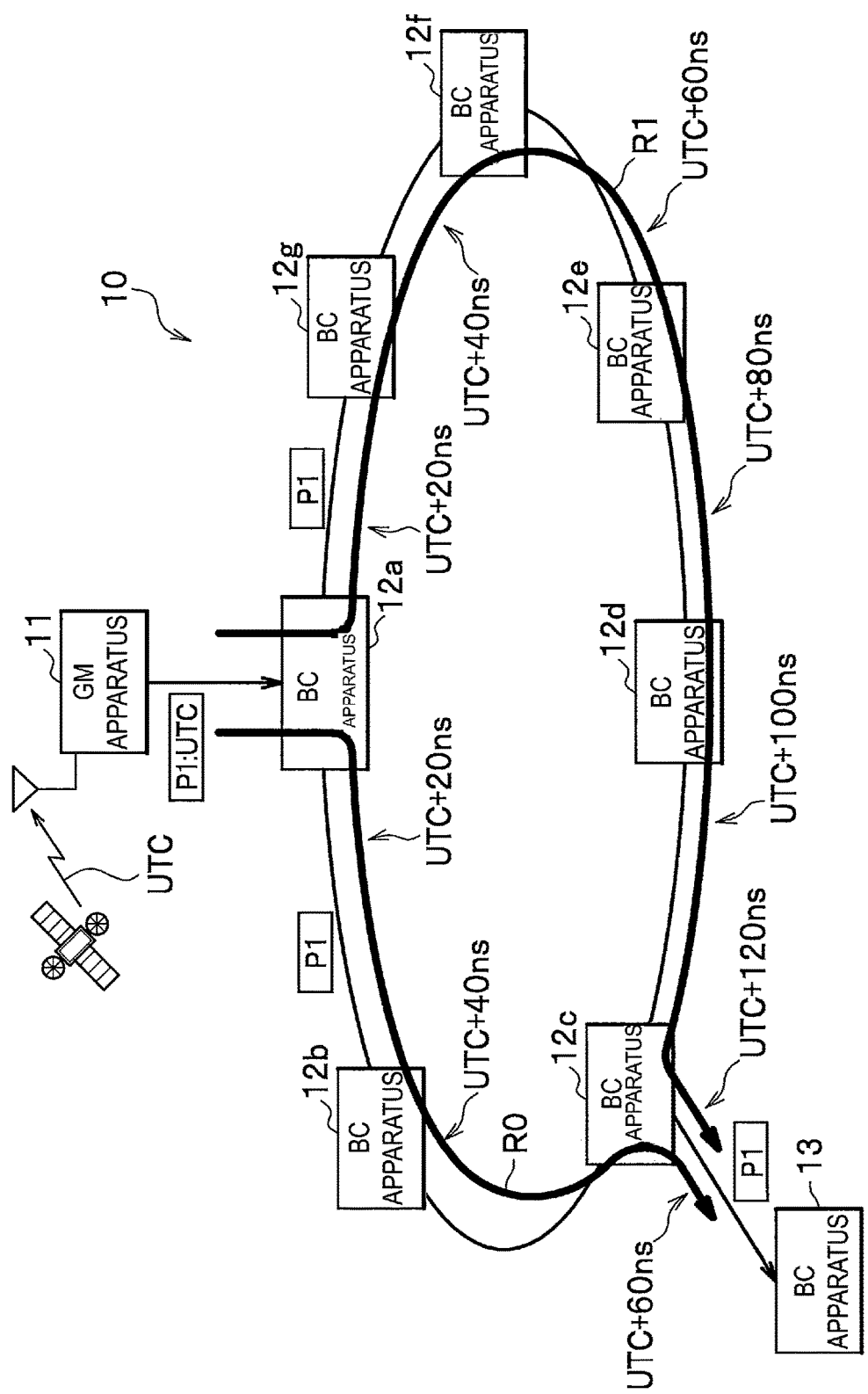
FIG. 10 is a block diagram illustrating a specific example of a second NW system having a GM apparatus and a plurality of BC apparatuses.
Figure 11:
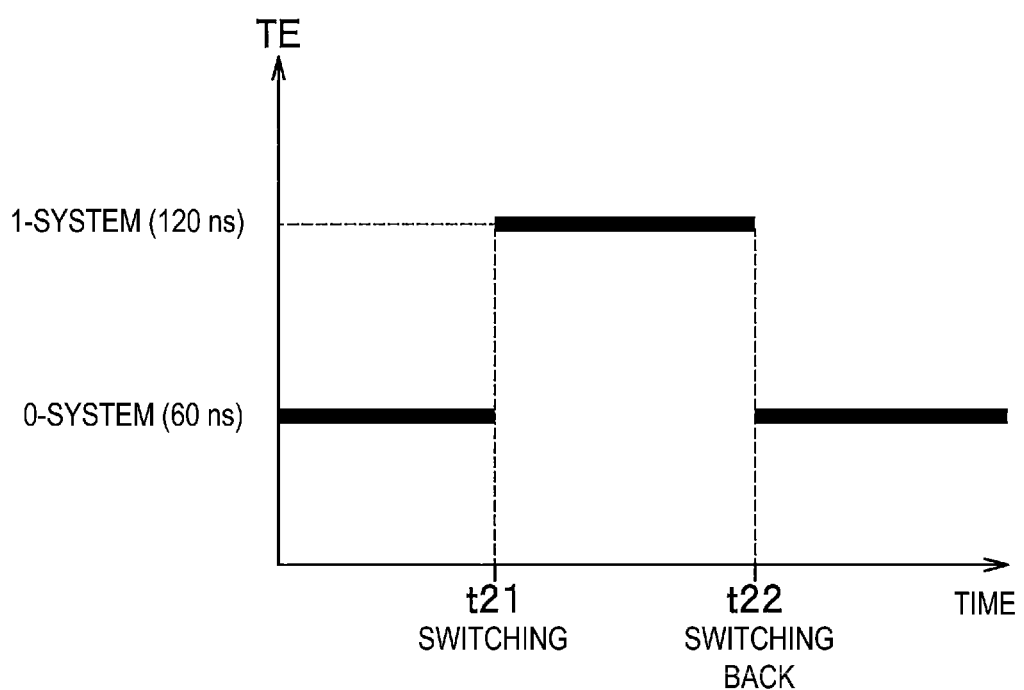
FIG. 11 is a diagram for explaining an operation of switching to a 1-system route when a failure occurs in a 0-system route.

It is assumed that a time synchronization apparatus 20 illustrated in FIG. 1 is mounted on a BC apparatus 12c in which two routes of a 0-system route R0 and 1-system route R1 are connected to the input side, in the NW system 10 illustrated in FIG. 10. The time synchronization apparatus 20 transfers the UTC from the GM apparatus 11, which receives and transmits the UTC, via the plurality of BC apparatuses 12a to 12g connected by the transfer path, thereby correcting the times of the BC apparatus 12a to 12g into the time of the GM apparatus 11 to perform time synchronization. The BC apparatus 12c constitutes a specific BC apparatus described in the claims.

Here, it is assumed that the 0-system route R0 in the NW system 10 is the working side and the 1-system route R1 is the protection side. Note that the 0-system route R0 is also simply referred to as the 0-system, and the 1-system route R1 is simply referred to as the 1-system.

Time synchronization apparatus 20 includes a 0-system PTP reception unit (also referred to as a 0-system reception unit) 21, a 1-system PTP reception unit (also referred to as a 1-system reception unit) 22, a failure restoration detection unit (also referred to as a detection unit) 23, a time calculation unit 24, a path switching unit (also referred to as a switching unit) 25, a time correction value holding unit (also referred to as a holding unit) 26, a 0-system PTP transmission unit (also referred to as a 0-system transmission unit) 27, and a 1-system PTP transmission unit (also referred to as a 1-system transmission unit) 28. An operator terminal 29 is connected to the time synchronization apparatus 20. The time calculation unit 24 constitutes a correction unit described in the claims.

The 0-system reception unit 21 receives the PTP packet (packet) P1 including the UTC+time error transferred via the 0-system route R0 from the BC apparatus 12a to the BC apparatus 12c illustrated in FIG. 10.

The 1-system reception unit 22 receives the packet P1 including the UTC+time error transferred via the 1-system route R1 from the BC apparatus 12a to the BC apparatus 12c.

The 0-system transmission unit 27 transmits the packet P1 received by the 0-system reception unit 21 to the BC apparatus 13 on the slave side (FIG. 10).

The 1-system transmission unit 28 transmits the packet P1 received by the 1-system reception unit 22 to the BC apparatus 13 on the slave side.

That is, in the time synchronization apparatus 20, the side of the 0-system reception unit 21 and the 1-system reception unit 22 is the slave side, as indicated as the slave side together with the dashed arrow, and the side of the 0-system transmission unit 27 and the 1-system transmission unit 28 is the master side, as indicated as the master side together with the dashed arrow.

The detection unit 23 detects a failure in the 0-system route R0 or the 1-system route R1, and outputs failure information D1 containing information on the detected failure route to the time calculation unit 24 and the switching unit 25. Further, the detection unit 23 detects the restoration of the failure in the 0-system route R0 or the 1-system route R1, and outputs restoration information D2 including the restored route information to the time calculation unit 24 and the switching unit 25.

The holding unit 26 holds the 0-system correction value and the 1-system correction value. The 0-system correction value is the value of the accumulated time error (cTE) on the 0-system route R0 side in the BC apparatus 12c of which the 0-system route R0 and the 1-system route R1 are connected to the input side. In the case of the example illustrated in FIG. 10, this time error is a total error (accumulated error) 60 ns of the BC apparatuses 12a, 12b, and 12c.

The 1-system correction value is a value of the accumulated error (cTE) on the 1-system route R1 side in the BC apparatus 12c. In the case of the example illustrated in FIG. 10, this error is a total error (accumulated error) 120 ns of the BC apparatuses 12a, 12g, 12f, 12e, 12d, and 12c.

The operator terminal 29 holds the accumulated error 60 ns of the 0-system route R0 measured in advance in the BC apparatus 12c as the 0-system correction value, and holds the accumulated error 120 ns of the 1-system route R1 as the 1-system correction value, in the holding unit 26.

The time calculation unit 24 performs correction by subtracting the 0-system correction value 60 ns held in the holding unit 26 from the time information UTC+60 ns (FIG. 10) of the 0-system route R0 currently switched by the switching unit 25, for example, and outputs the resulting UTC to the switching unit 25 as time information. The same applies to the case of the 1-system route R1.

Further, when the detection unit 23 detects a failure, for example, when a failure of the 0-system route R0 is detected and failure information D1 is input, the time calculation unit 24 performs correction by subtracting the 1-system correction value 120 ns held in the holding unit 26 from the time information UTC+120 ns of the other normal 1-system route R1, and outputs the resulting UTC to the switching unit 25 as time information. By this correction, for example, the accumulated error 120 ns (FIG. 10) is canceled by the 1-system correction value 120 ns to become 0, and only UTC is obtained as the 1-system time information. Further, in the case of a failure of the 1-system route R1, correction is performed by subtracting the 0-system correction value, and only UTC is obtained as the time information of 0-system.

Further, when the detection unit 23 detects the restoration, for example, when the restoration of the failed 0-system route R0 is detected and the restoration information D2 is input, the time calculation unit 24 performs correction by subtracting the 0-system correction value 60 ns held in the holding unit 26 from the time information UTC+60 ns of the restored 0-system route R0, and outputs the resulting UTC to the switching unit 25 as time information. By this correction, only UTC is obtained as the time information of the 0-system. When the failed 1-system route R1 is restored, correction value is obtained by subtracting the 1-system correction value and only UTC is obtained as the time information of 1-system.

When the detection unit 23 detects failure, for example, when the failure of the 0-system route R0 is detected and the failure information D1 is input, the switching unit 25 switches to the other normal 1-system route R1. That is, switching is performed such that the packet P1 including time information relating to the other normal 1-system route R1, which is the result of calculation by the time calculation unit 24, is transferred from the 1-system transmission unit 28 to the slave at the subsequent stage. Further, in the case of a failure in the 1-system route R1, switching to the other normal 0-system route R0 is performed.

When the detection unit 23 detects the restoration, for example, when the restoration of the failed 0-system route R0 is detected and the restoration information D2 is input, the switching unit 25 performs switching back to the 0-system route R0. At this time, the switching unit 25 performs switching back such that the packet P1 including time information relating to the 0-system route R0 for which restoration is detected, which is the result of calculation by the time calculation unit 24, is transferred from the 0-system transmission unit 27 to the slave at the subsequent stage. Further, in the case of restoration of the 1-system route R1, switching back to the 1-system route R1 is performed.

Operation of First Embodiment

Figure 2:
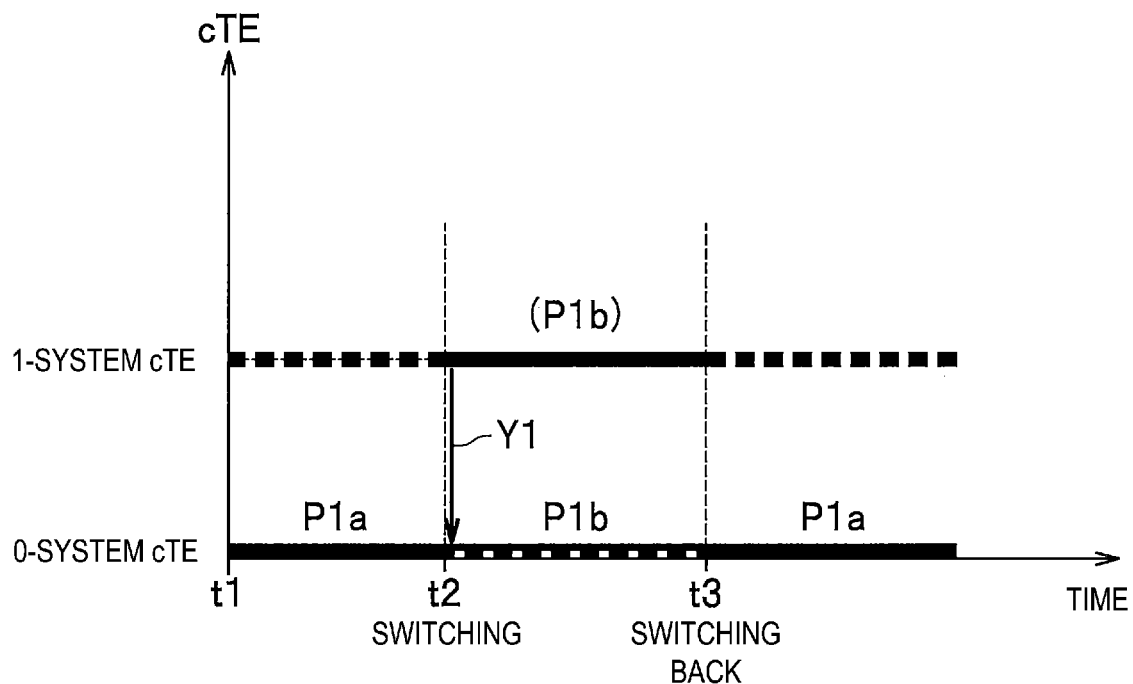
FIG. 2 is a diagram for explaining a time synchronization operation of the time synchronization apparatus mounted on a BC apparatus of a NW system according to the first embodiment.

Next, a time synchronization operation of the time synchronization apparatus 20 mounted on the BC apparatus 12c in the NW system 10 (FIG. 10) according to the first embodiment will be described with reference to FIG. 2. In FIG. 2, the horizontal axis indicates time, and the vertical axis indicates cTE which is the time error between the 0-system and the 1-system in the BC apparatus 12c.

As a precondition, it is assumed that the switching unit 25 has switched to the 0-system route R0 side between times t1 and t2 illustrated on the horizontal axis in FIG. 2. That is, the packet P1a including the time information UTC+60 ns (FIG. 10) received by the 0-system reception unit 21 is transmitted to the slave-side BC apparatus 13 from the 0-system transmission unit 27 via the detection unit 23, the time calculation unit 24, and the switching unit 25.

At this time, assuming that the detection unit 23 detects a failure in the 0-system route R0, the failure information D1 is supplied to the time calculation unit 24 and the switching unit 25. The time calculation unit 24 to which this supply has been performed corrects by subtracting the 1-system correction value 120 ns held in the holding unit 26 from the time information UTC+120 ns of the other normal 1-system route R1. By this correction, the accumulated error 120 ns of the time information of the 1-system is canceled by the correction value 120 ns of the 1-system to become 0 and only UTC is used as the time information of the 1-system. The UTC of the calculation result is output to the switching unit 25.

On the other hand, the switching unit 25 to which failure information D1 has been supplied performs switching to the normal 1-system route R1 at time t2 illustrated in FIG. 2. The accumulated error in the packet P1b for transferring this 1-system route R1 is the value of the 1-system cTE (for example, 120 ns) on the vertical axis of FIG. 2, on the input side of the time calculation unit 24. However, on the output side of the time calculation unit 24, the accumulated error 120 ns is canceled by the time calculation unit 24, and only the UTC is provided. Thus, the packet P1b on the 1-system side is the packet P1b including only the UTC, similar to the packet P1a including only the UTC of the 0-system cTE on the vertical axis, as indicated by the downward arrow Y1 in FIG. 2. The packet P1b including only the UTC is transmitted from the 1-system transmission unit 28 to the BC apparatus 13.

Thereafter, when the detection unit 23 detects the restoration of the failed 0-system route R0, the restoration information D2 is supplied to the time calculation unit 24 and the switching unit 25. The time calculation unit 24 to which this supply has been performed corrects by subtracting the 0-system correction value 60 ns from the time information UTC+60 ns of the restored 0-system route R0. By this correction, the accumulated error 60 ns is canceled to become 0, and only UTC is obtained as time information of the 0 system. The UTC of the calculation result is output to the switching unit 25.

On the other hand, the switching unit 25 to which the restoration information D2 is supplied performs switching back to the restored 0-system route R0 at the time t3. The time information included in the packet P1a on the switched-back 0-system route R0 side is only UTC because the accumulated error 60 ns of the 0-system is already canceled by the time calculation unit 24. The packet P1a including only the UTC is transmitted from the 0-system transmission unit 27 to the BC apparatus 13.

In the above description, the description has been made with respect to the two-system transfer path of the 0-system route R0 and the 1-system route R1, but even in a case of three or more transfer paths, switching or switching back can be performed at the time of failure or restoration.

Effects of First Embodiment

The effect of the time synchronization apparatus 20 according to the present embodiment will be described.

(1) The time synchronization apparatus 20 is mounted on a specific BC apparatus in which two systems of at least a 0-system route R0 and a 1-system route R1 having different transfer delays are connected to an input side, among the plurality of BC apparatuses 12a to 12g, and includes the holding unit 26, the detection unit 23, and the time calculation unit 24 as the correction unit, and the switching unit 25.

The holding unit 26 holds the following correction values.

A 0-system correction value in which a time error resulting from delay of UTC due to performance inherent to the BC apparatus is the same value as a time error accumulated in the BC apparatuses 12a to 12b and the specific BC apparatus 12c which are connected on the 0-system route R0 (the transfer path of the 0-system).

A 1-system correction value having the same value as the time error accumulated in the BC apparatuses 12a, 12g to 12d connected to the 1-system route R1 (the transfer path of 1-system) and the specific BC apparatus 12c.

The detection unit 23 detects a failure in the 0-system route R0 or the 1-system route R1. When the detection unit 23 detects, for example, a failure of the 0-system route R0, the time calculation unit 24 performs correction by subtracting the 1-system correction value related to the normal 1-system route R1 from the UTC having the accumulated time error on the normal 1-system route R1 side.

The switching unit 25 switches to the normal 1-system route R1 such that the UTC obtained by the correction is transferred, when the failure is detected.

According to this configuration, when the switching unit 25 is switched to the normal 1-system route R1, the time information input from the time calculation unit 24 to the normal 1-system route R1 after the switching is only the UTC resulting from the subtraction of the 1-system correction value from the time error accumulated in the normal 1-system route R1. As described above, the time information transferred via the failed 0-system route R0 before the switching is only the UTC resulting from the correction by the time calculation unit 24 in the same manner as described above.

Thus, the time information transferred via the 1-system route R1 after the switching becomes the same time information as only the UTC transferred via the 0-system route R0 before the switching, and there is no difference due to the time error between before and after the switching. From this, when switching from the failed 0-system route R0 to the normal 1-system route R1, there is no jump in time in which time jumps due to the difference caused by the time error. Thus, the quality of the time information does not deteriorate, and the quality of the time information can be improved.

(2) The detection unit 23 detects restoration of the failure in the 0-system route R0 or the 1-system route R1. For example, it is assumed that the detection unit 23 detects the restoration of the failed 0-system route R0. The time calculation unit 24 performs correction by subtracting the 0-system correction value related to the restored 0-system route R0 from the UTC having the accumulated time error on the 0-system route R0 side where the restoration is detected. The switching unit 25 performs a process of switching back to the 0-system route R0 where restoration is detected such that the UTC obtained by the correction is transferred.

According to this configuration, after switching to the normal 1-system route R1 due to the failure of the 0-system route R0, when the failed 0-system route R0 is restored, switching back to the restored 0-system route R0 can be performed without a jump in time. Thus, the quality of the time information does not deteriorate at the time of switching back, so that the quality of the time information can be improved.

Application Example 1 of First Embodiment

This Application Example 1 is different from the first embodiment in that the time calculation unit 24 and the switching unit 25 illustrated in FIG. 1 perform the following processing.

That is, when the detection unit 23 detects the failure of the 0-system route R0 or the 1-system route R1, for example, when the failure of the 0-system route R0 is detected, in a case where the switching unit 25 switches to the normal 1-system route R1, the switching unit 25 has a first function of detecting occurrence of a jump in time which is a difference, due to a time error, between before switching and after switching, on the 1-system route R1 after the switching.

The time calculation unit 24 has a second function of performing calculation of gradually reducing a time error of the UTC which is time information transferred on the 1-system route R1 after switching within a predetermined time such that the difference, due to the time error, between before switching and after switching becomes 0, when the jump in time is detected by the switching unit 25.

Figure 3:
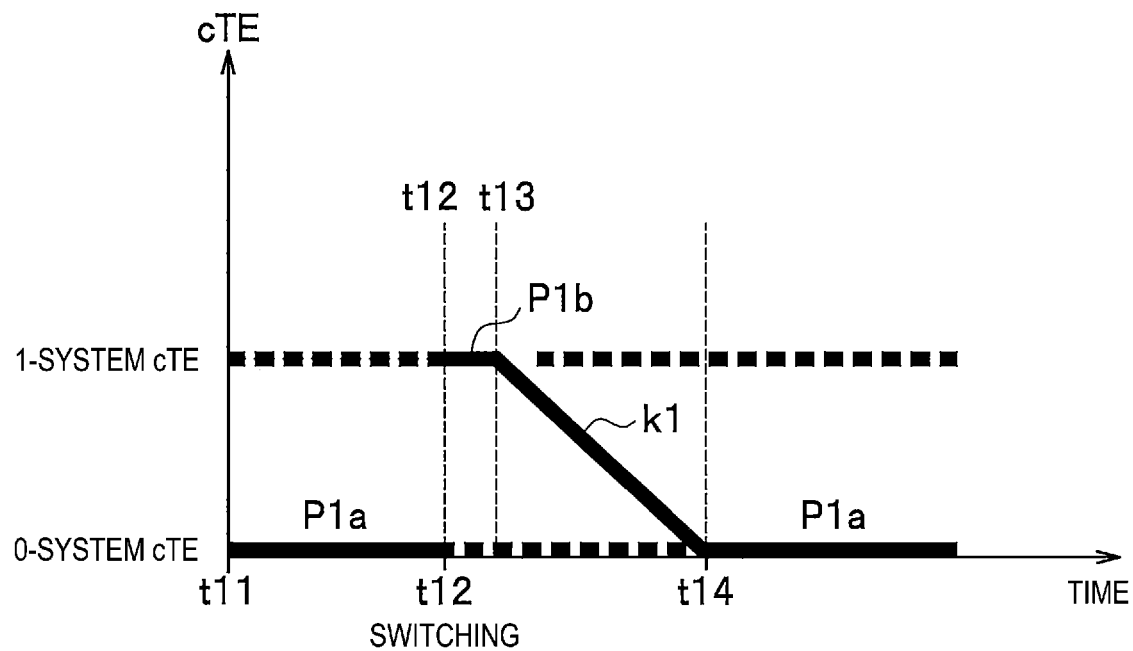
FIG. 3 is a diagram for explaining a time synchronization operation of the time synchronization apparatus mounted on a BC apparatus of a NW system according to an application example of the first embodiment.

Processing examples of the first and second functions of the switching unit 25 and the time calculation unit 24 will be described with reference to FIG. 3. As a precondition, it is assumed that the switching unit 25 has switched to the 0-system route R0 side between times t11 and t12 illustrated on the horizontal axis in FIG. 3. In this case, the packet P1a including only the UTC obtained by subtracting the 0-system correction value 60 ns from the time information UTC+60 ns by the time calculation unit 24 is transmitted on the 0-system route R0.

In this case, it is assumed that the detection unit 23 detects a failure in the 0-system route R0, the switching unit 25 switches to the normal 1-system route R1 at time t12, and thereafter, a jump in time has been detected in the 1-system route R1 after the switching. The detected jump in time occurs because the packet P1b including the time information UTC+120 ns passing without the subtraction being performed by the time calculation unit 24 is transferred on the 1-system route R1 after the switching.

Thus, the time calculation unit 24 performs calculation of gradually reducing the time error 120 ns of the UTC transferred on the 1-system route R1 after the switching as indicated by the oblique line k1 such that the difference due to the time error 120 ns before switching and after the switching becomes 0 within a predetermined time between the times t13 and t14. By this calculation, at time t14, the time error 120 ns becomes 0, and the packet P1a including only UTC is transferred on the 1-system route R1.

As described above, when a jump in time occurs at the time of route switching, by gradually reducing the time error 120 ns to 0 within the predetermined time in this way, the effect of the change in the time error on the downstream BC apparatus 13 (FIG. 10) does not occur transiently, which suppresses an adverse effect on quality of time information of the BC apparatus 13.

When the time error 120 ns at the time of occurrence of the jump in time becomes 0 in a short time after route switching, the sudden change causes a transient phenomenon, which adversely affects the quality of the time information in the BC apparatus 13 on the downstream side.

Application Example 2 of First Embodiment

Figure 4:
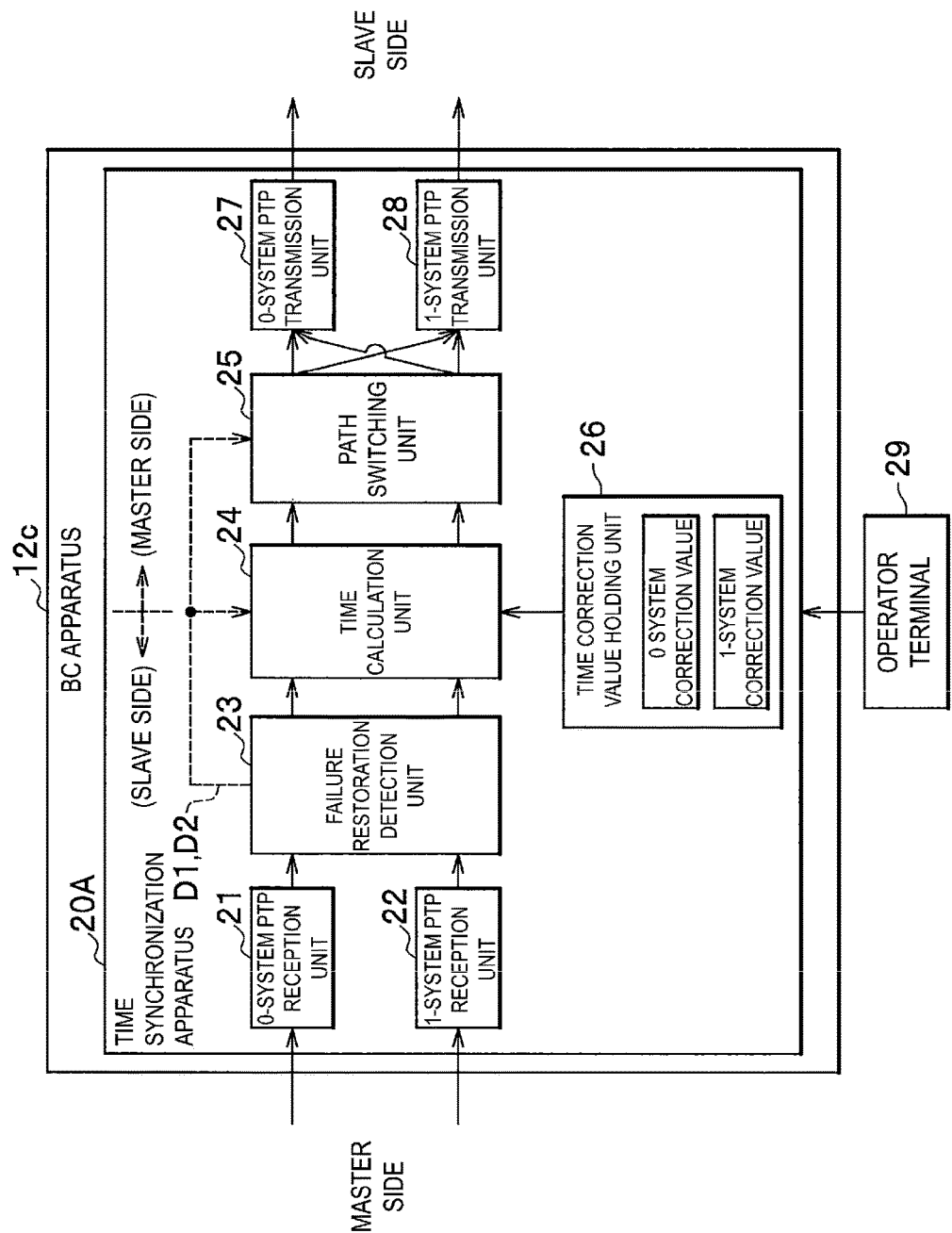
FIG. 4 is a block diagram illustrating a configuration of a time synchronization apparatus according to Application Example 2 of the first embodiment.

FIG. 4 is a block diagram illustrating a configuration of a time synchronization apparatus 20A according to Application Example 2 of the first embodiment of the present disclosure.

Figure 5:
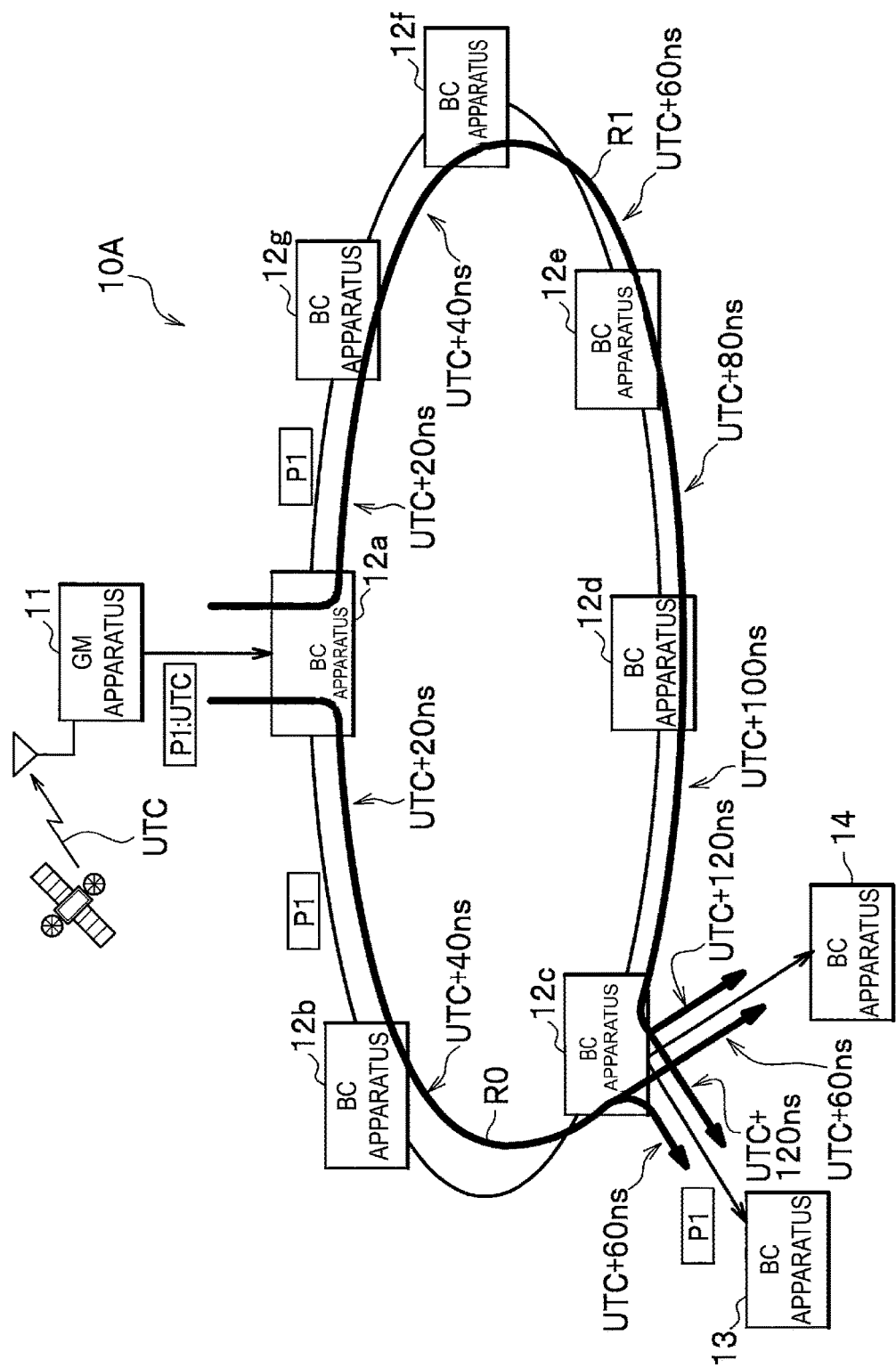
FIG. 5 is a block diagram illustrating a specific example of a first NW system having a GM apparatus and a plurality of BC apparatuses.

This time synchronization apparatus 20A is applied to the BC apparatus 12c of the NW system 10A illustrated in FIG. 5. That is, the time synchronization apparatus 20A is applied to the BC apparatus 12c in which at least two routes R0 and R1 of both the 0 system and the 1 system are input from the upstream side, the BC apparatus 13 and the BC apparatus 14 are connected to the downstream side (output side), and the downstream side has at least two branches.

When the detection unit 23 detects a failure (for example, a failure of the 0-system route R0), the switching unit 25 of the time synchronization apparatus 20A switches to the other normal 1-system route R1, and performs switching such that the packet P1 of the time information relating to the 1-system route R1 after switching is transferred from both the 0-system transmission unit 27 and the 1-system transmission unit 28 to the BC apparatus 13 and the BC apparatus 14 which are slaves at the subsequent stage.

According to the time synchronization apparatus 20A of such Application Example 2, even when the downstream side of the BC apparatus 12c to which at least two routes R0 and R1 of both the system 0 and the system 1 are input from the upstream side has at least two branches, when one of the routes (for example, R0) fails, the time information of the normal route R1 can be transferred to both the two BC apparatuses 13 and 14 on the downstream side.

Configuration of Second Embodiment

Figure 6:
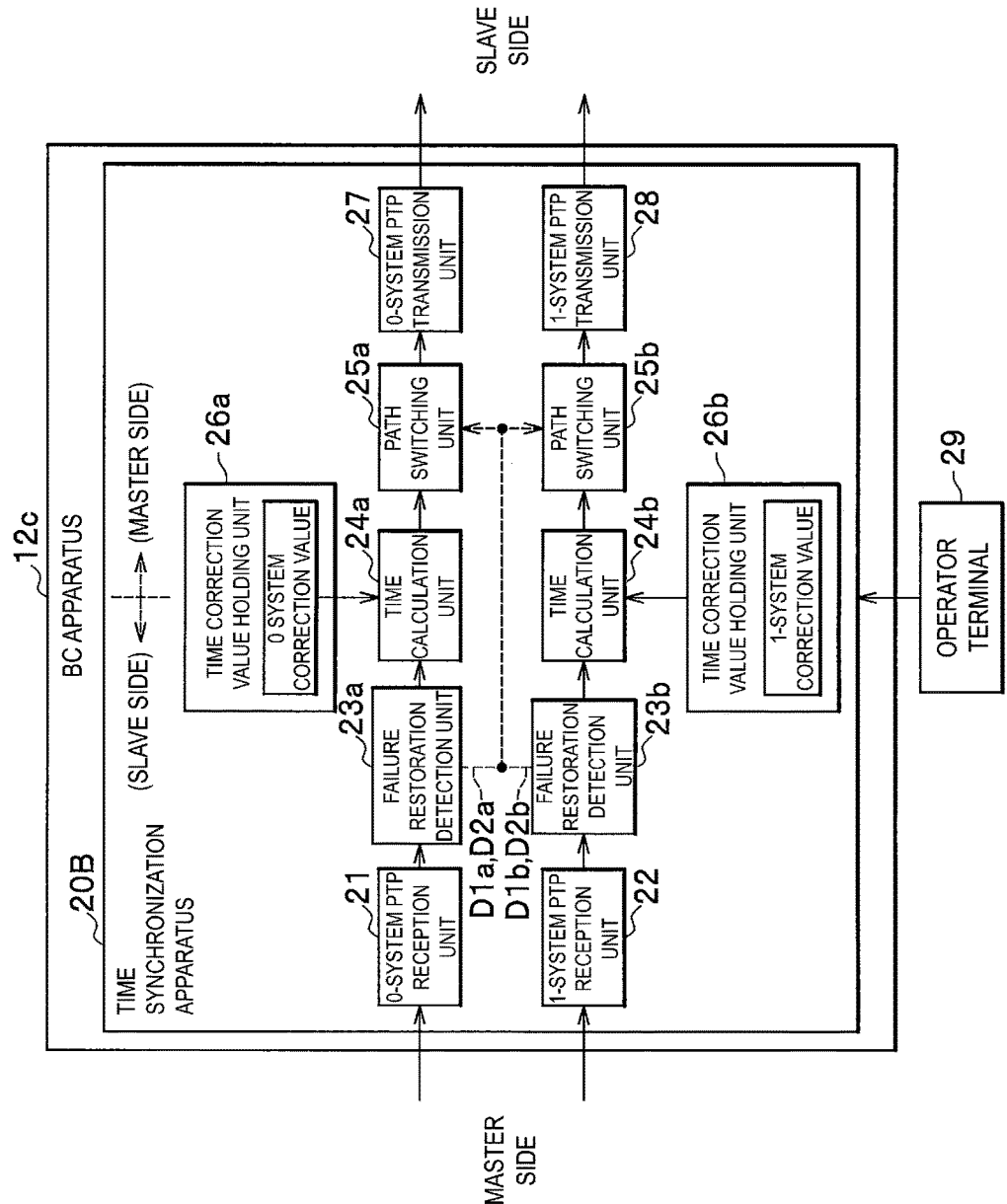
FIG. 6 is a block diagram illustrating a configuration of a time synchronization apparatus according to a second embodiment of the present disclosure.

FIG. 6 is a block diagram illustrating a configuration of a time synchronization apparatus according to a second embodiment of the present disclosure. However, in the time synchronization apparatus 20B illustrated in FIG. 6, the same parts as those in the time synchronization apparatus 20 illustrated in FIG. 1 are denoted by the same reference numerals, and description will be omitted as appropriate.

The time synchronization apparatus 20B of the second embodiment illustrated in FIG. 6 is different from the time synchronization apparatus 20 of the first embodiment in that the failure restoration detection units 23a and 23b, the time calculation units 24a and 24b, the path switching units 25a and 25b, and the time correction value holding units 26a are 26b are divided into a 0-system route R0 side and a 1-system route R1 side and provided exclusively for each system.

Note that the detection unit 23a constitutes the 0-system detection unit described in the claims, and the detection unit 23b constitutes the 1-system detection unit described in the claims. Here, when the "described in the claims" is omitted, the time calculation unit 24a constitutes the 0-system correction unit, and the time calculation unit 24b constitutes the 1-system correction unit. The switching unit 25a constitutes a 0-system switching unit, and the switching unit 25b constitutes a 1-system switching unit. The holding unit 26a constitutes a 0-system holding unit, and the holding unit 26b constitutes a 1-system holding unit.

The operator terminal 29 holds in the holding unit 26a of the 0-system, the accumulated error 60 ns of the 0-system route R0, which is measured in advance in the BC apparatus 12c, as the 0-system correction value, and holds in the holding unit 26 of the 1-system, the accumulated error 120 ns of the 1-system route R1 as the 1-system correction value.

Next, the detection unit 23a, the time calculation unit 24a, and the switching unit 25a on the 0-system route R0 will be described.

The detection unit 23a detects a failure in the 0-system route R0, and outputs this failure information D1a to the switching units 25a and 25b of both the 0-system and 1-system. Further, the detection unit 23a detects restoration of the failure of the 0-system route R0, and outputs this restoration information D2a to the switching units 25a and 25b of both the 0-system and the 1-system.

The time calculation unit 24a performs correction by subtracting the 0-system correction value 60 ns held in the holding unit 26 from the time information UTC+60 ns (FIG. 10) of the 0-system route R0, and outputs the resulting UTC to the switching unit 25a as time information.

The switching unit 25a transfers the packet P1 including only the UTC, which is the correction result of the time calculation unit 24a, to the 0-system route R0, and outputs the packet P1 to the 0-system transmission unit 27. Further, the 0 system switching unit 25a to which the failure information D1a of the 0 system route R0 is input from the detection unit 23a stops transferring the time information of the 0 system route R0. The switching unit 25b of the 1-system receiving the same input starts transferring the time information of the 1-system route R1.

On the other hand, when the restoration information D21a of the 0-system route R0 is input from the detection unit 23a to the switching units 25a and 25b of both the 0-system and the 1-system, the switching unit 25a of the 0-system restores the transfer of the time information of the 0-system route R0. The switching unit 25b of the 1-system stops transferring of the time information of the 1-system route R1.

Next, the detection unit 23b, the time calculation unit 24b, and the switching unit 25b on the 1-system route R1 will be described.

The detection unit 23b detects a failure in the 1-system route R1, and outputs this failure information D1b to the switching units 25a and 25b of both the 0-system and the 1-system. Further, the detection unit 23b detects restoration of the failure of the 1-system route R1, and outputs the restoration information D2b to the switching units 25a and 25b of both the 0-system and the 1-system.

The time calculation unit 24b performs correction by subtracting the 1-system correction value 120 ns held in the holding unit 26 from the time information UTC+120 ns (FIG. 10) of the 1-system route R1, and outputs the resulting UTC to the switching unit 25b as time information.

The switching unit 25b transfers the packet P1 including only the UTC, which is the correction result of the time calculation unit 24b, to the 1-system route R1, and outputs the packet P1 to the 1-system transmission unit 28. Further, the switching unit 25b of the 1-system to which the failure information D1b of the 1-system route R1 is input from the detection unit 23b stops transferring the time information of the 1-system route R1. The input switching unit 25a of the 0-system receiving the same input starts transferring the time information of the 0-system route R0.

On the other hand, when the restoration information D2b of the 1-system route R1 is input from the detection unit 23b to the switching units 25a and 25b of both the 0-system and the 1-system, the switching unit 25b of the 1-system restores the transfer of the time information of the 1-system route R1. The switching unit 25a of the 0-system stops transferring the time information of the 0-system route R0.

Effect of Second Embodiment

The time synchronization apparatus 20B according to the second embodiment is configured by providing components including the failure restoration detection units 23a, 23b, the time calculation units 24a, 24b, the path switching units 25a, 25b, and the time correction value holding units 26a, 26b separately for the 0-system and the 1-system. Thus, even when one of the components of the system 0 or 1 fails, the time synchronization process can be normally executed by the other normal component.

Further, for example, when the failed 0-system route R0 is restored after switching to the normal 1-system route R1 due to the failure of the 0-system route R0, the time error of the time information transferred on the restored 0-system route R0 is inevitably corrected by the time calculation unit 24a. Thus, for example, when restoration of the transfer path of the 0-system is detected, in a case where a process of switching back to the transfer path of the 0-system is performed, the 0-system switching unit can perform switching back to the restored system transfer path without time jump. Consequently, the quality of the time information does not deteriorate at the time of the switching back, so that the quality of the time information can be improved.

Application Example of Second Embodiment

Figure 7:
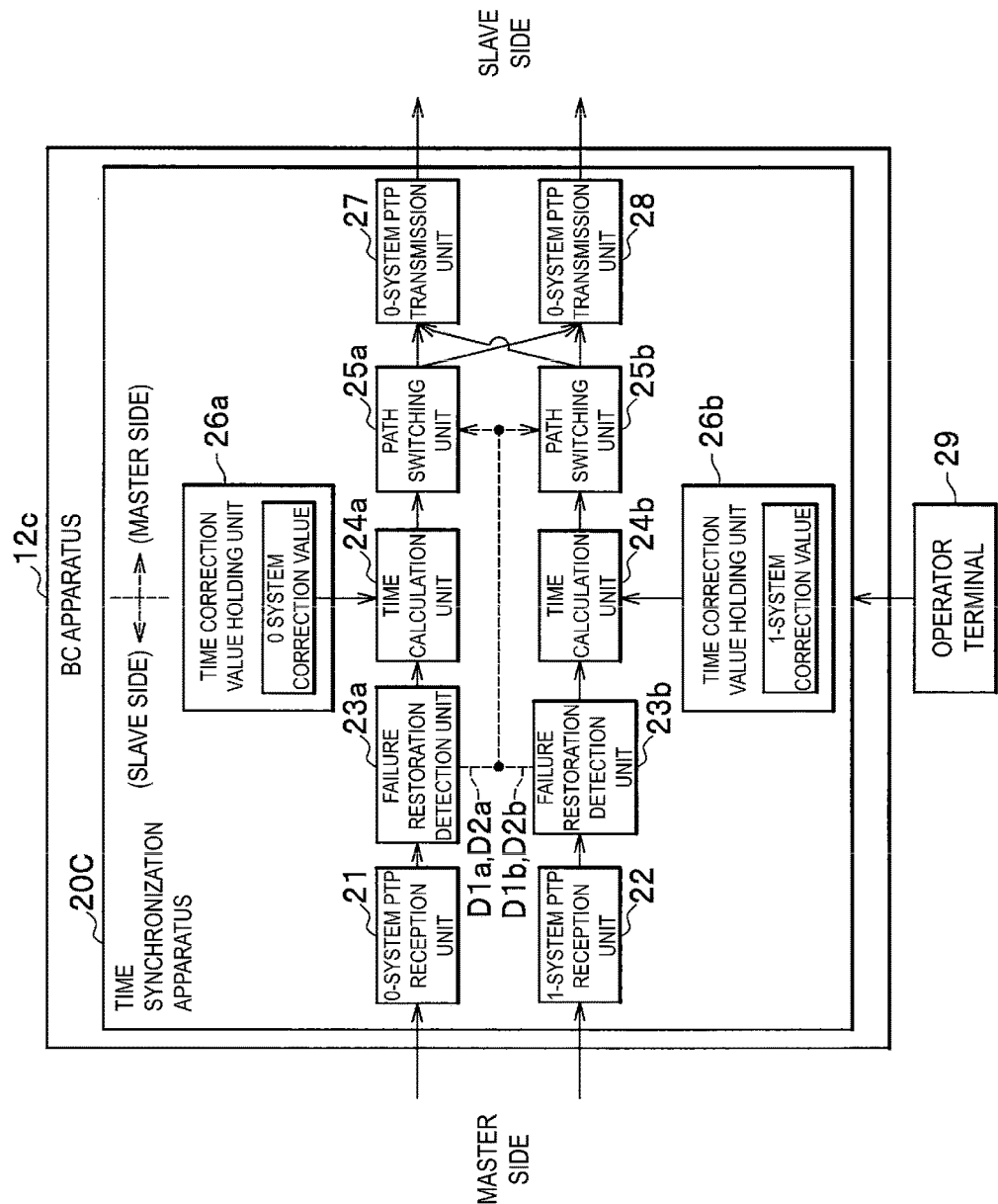
FIG. 7 is a block diagram illustrating a configuration of a time synchronization apparatus according to an application example of the second embodiment.

FIG. 7 is a block diagram illustrating a configuration of a time synchronization apparatus 20C according to an application example of the second embodiment of the present disclosure.

This time synchronization apparatus 20C is applied to the BC apparatus 12c of the NW system 10A illustrated in FIG. 5, similarly to the above-described time synchronization apparatus 20A illustrated in FIG. 4.

In the time synchronization apparatus 20C, for example, the switching unit 25a of the 0 system to which the failure information D1a of the 0 system route R0 is input from the detection unit 23a stops transfer of the time information of the 0 system route R0, and the switching unit 25b of the 1-system receiving the same input performs switching such that the time information of the 1-system route R1 is transferred from both the 0-system transmission unit 27 and the 1-system transmission unit 28 to the BC apparatus 13 and the BC apparatus 14 which are slaves at the subsequent stage.

According to the time synchronization apparatus 20C of such an application example, even when the downstream side of the BC apparatus 12c to which at least two routes R0 and R1 of both the system 0 and the system 1 are input from the upstream side has at least two branches, when one of the routes (for example, R0) fails, the time information of the normal route R1 can be transferred to both the two BC apparatuses 13 and 14 on the downstream side. Further, even when one of the components of the system 0 or 1 fails, the time synchronization process can be normally executed by the other normal component.

Application Example of Time Synchronization Apparatus

An example in which the above-described time synchronization apparatus 20B (or the time synchronization apparatus 20) is applied to ring protection by a packet transport technique called Multi Protocol Label Switching-Transport Profile (MPLS-TP) will be described.

Ring protection is a method in which in an NW configuration in which a plurality of communication apparatuses are connected in a ring shape by a two-way two-core optical fiber, when a failure occurs while transferring a packet to one optical fiber, a packet is transferred by switching to the other optical fiber.

Figure 8:
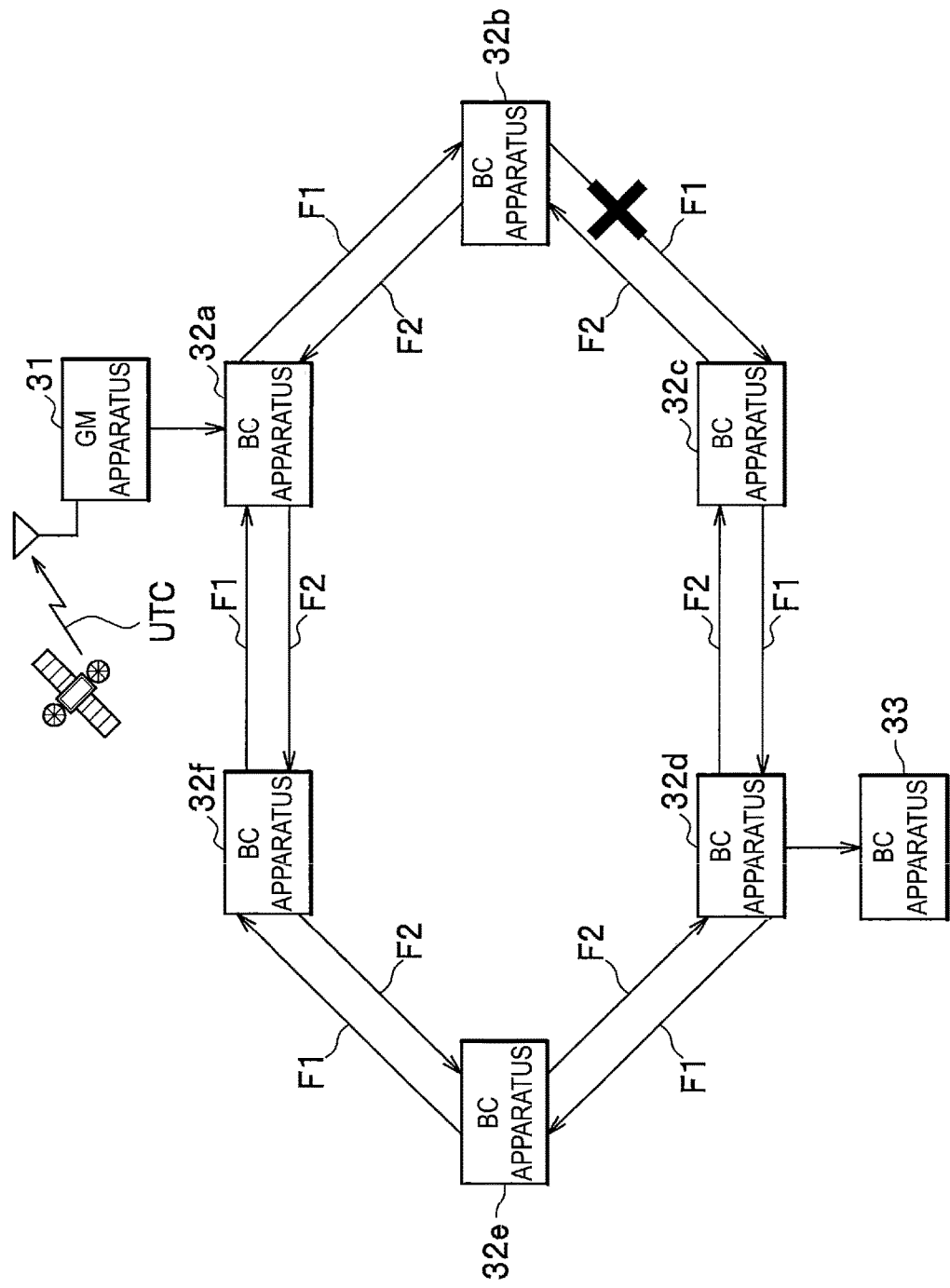
FIG. 8 is a diagram illustrating an NW configuration of ring protection to which the time synchronization apparatus according to the first or second embodiment is applied.
Figure 9:
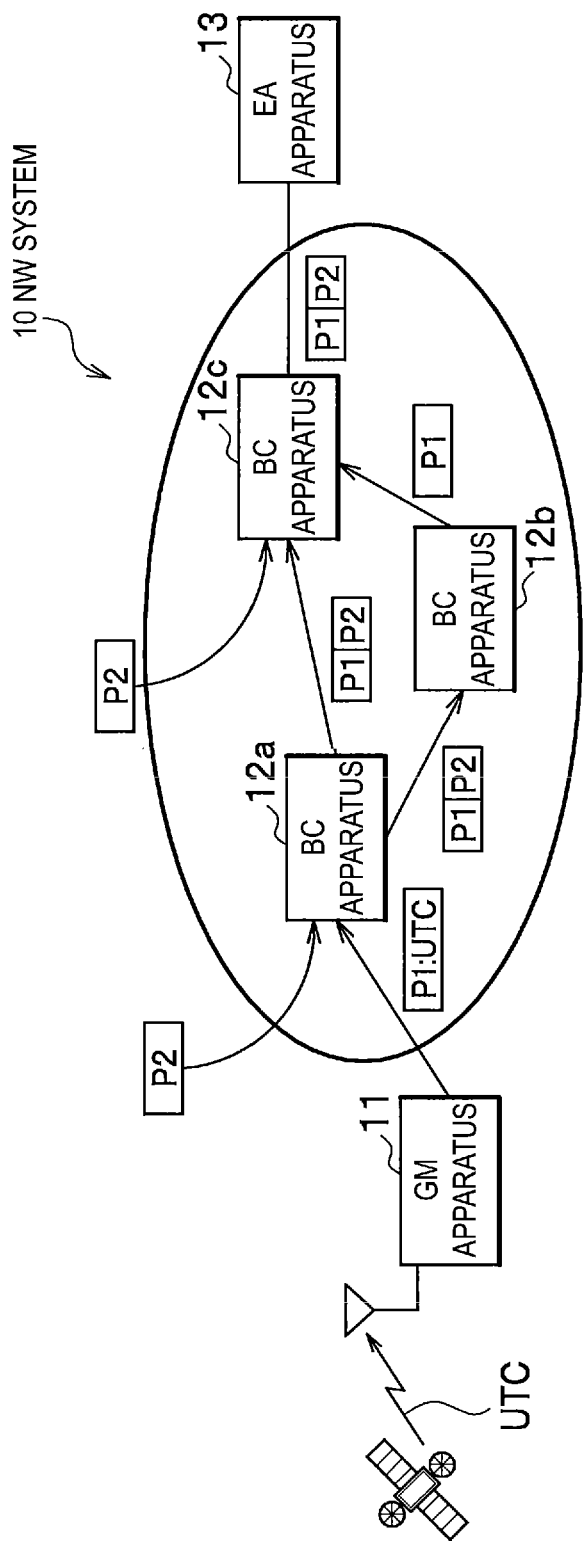
FIG. 9 is a block diagram of a NW system having a GM apparatus and a plurality of BC apparatuses.

FIG. 8 illustrates the NW configuration of the ring protection. As illustrated in FIG. 8, a plurality of BC apparatuses 32a, 32b, 32c, 32d, 32e, and 32f are connected in a ring shape by bidirectional two-core optical fibers F1 and F2, the GM apparatus 31 is connected to the BC apparatus 32a by an optical fiber, and the BC apparatus 33 as the EA apparatus (FIG. 9) is connected to the BC apparatus 32d by an optical fiber.

It is assumed that a time synchronization apparatus 20B (FIG. 6) is mounted on each of the BC apparatuses 32a to 32f connected in a ring shape. In the time synchronization apparatus 20B, one optical fiber F1 is connected to the input side of the 0-system reception unit 21 and the output side of the 0-system transmission unit 27, and the other optical fiber F2 is connected to the input side of the 1-system reception unit 22 and the output side of the 1-system transmission unit 28.

In such an NW configuration, it is assumed that a packet (PTP packet) including the UTC of the time information from the GM apparatus 31 is transferred to the BC apparatus 33 via one of the optical fibers F1 via the BC apparatuses 32a, 32b, 32c, and 32d. It is assumed that a failure indicated by a cross occurs in the optical fiber F1 between the BC apparatus 32b and the BC apparatus 32c during this transfer.

This failure is detected by the 0-system detection unit 23a of the time synchronization apparatus 20B mounted on the BC apparatus 32c on the transfer direction rear side of the location where the failure has occurred, and in response to this detection, the 0-system switching unit 25a stops transferring the time information of one optical fiber F1. Due to this stop, the stop of the transferring of the time information on one optical fiber F1 is detected as a failure in the time synchronization apparatus 20B of all the BC apparatuses 32a to 32f.

Thus, the transferring of the time information of one optical fiber F1 is stopped by the switching unit 25a of the 0 system of the time synchronization apparatus 20B mounted on all the BC apparatuses 32a to 32f. At the same time, the transferring of the time information in the other optical fiber F2 is started by the switching unit 25b of the 1-system.

By starting transferring of the time information by switching to the optical fiber F2, the packet of the time information including the UTC from the GM apparatus 31 is transferred to the BC apparatus 33 via the BC apparatuses 32a, 32f, 32e, and 32d by the other optical fiber F2.

In addition, the specific configuration can be appropriately changed without departing from the gist of the present invention.

REFERENCE SIGNS LIST 11, 31 GM apparatus
12a to 12g, 32a to 32f BC apparatus
13, 33 BC apparatus (EA apparatus)
20, 20A, 20B Time synchronization apparatus
21 0-system PTP reception unit
22 1-system PTP reception unit
23, 23a, 23b Failure restoration detection unit (detection unit)
24, 24a, 24b Time calculation unit (correction unit)
25, 25a, 25b Path switching unit (switching unit)
26, 26a, 26b Time correction value holding unit (holding unit)
27 0-system PTP transmission unit
28 1-system PTP transmission unit
29 Operator terminal

The invention claimed is:

1. A time synchronization apparatus for performing time synchronization by transferring Coordinated universal time (UTC) transmitted from a Grand master clock (GM) apparatus, which receives the UTC as time information, via a first plurality of Boundary Clock (BC) apparatuses connected by a transfer path and correcting time of each of one or more of the first plurality of BC apparatuses to time of the GM apparatus, the time synchronization apparatus being mounted on a specific BC apparatus, among the first plurality of BC apparatuses, having an input side to which time information transfer paths of at least two systems of a 0-system and a 1-system having different transfer delays are connected, the time synchronization apparatus comprising:

a holding unit configured to hold a 0-system correction value as indicating a time error accumulated on a transfer path side of the 0-system and hold a 1-system correction value indicating a time error accumulated on a transfer path side of the 1-system;

a detection unit configured to detect a failure in the transfer path of the 0-system or the 1-system;

a correction unit configured to perform correction when a failure is detected by subtracting the 0-system correction value or the 1-system correction value relating to a normal transfer path from the UTC having the time error accumulated on a normal transfer path side; and a switching unit configured to switch to the normal transfer path side when a failure is detected such that the UTC obtained by the correction is transferred to one or more of a second plurality of BC apparatus downstream of the specific BC apparatus.

2. The time synchronization apparatus according to claim 1, wherein the detection unit is configured to detect restoration of a failure of the transfer path of the 0-system or the 1-system;

the correction unit is configured to perform correction by subtracting the 0-system correction value or the 1-system correction value relating to a restored transfer path from the UTC having the time error accumulated on the transfer path side for which restoration is detected; and the switching unit is configured to perform a process of switching back to the transfer path for which the restoration is detected such that the UTC obtained by the correction is transferred.

3. The time synchronization apparatus according to claim 1, wherein the switching unit is configured to detect, in a case where the switching unit performs switching to the normal transfer path when a failure is detected, an occurrence of a jump in time, on the transfer path after switching due to a time error; and the correction unit is configured to perform, in a case where a jump in time is detected, a process of reducing a time error of the UTC transferred on a transfer path after switching within a predetermined time such that the jump in time is suppressed.

4. The time synchronization apparatus according to claim 1, wherein an output side of the specific BC apparatus is connected to time information transfer paths of at least two systems of a 0-system and a 1-system; and the switching unit is configured to perform switching when a failure is detected by the detection unit such that the UTC obtained by the correction performed by the correction unit is transferred to the transfer paths of the two systems on the output side of the specific BC apparatus.

5. A time synchronization apparatus for performing time synchronization by transferring UTC transmitted from a GM apparatus, which receives the UTC as time information, via a first plurality of Boundary Clock (BC) apparatuses connected by a transfer path and correcting time of each of one or more of the first plurality of BC apparatuses to time of the GM apparatus, the time synchronization apparatus being mounted on a specific BC apparatus, among the first plurality of BC apparatuses, having an input side to which time information transfer paths of at least two systems of a 0-system and a 1-system having different transfer delays are connected, the time synchronization apparatus comprising:

a 0-system holding unit configured to hold a 0-system correction indicating a time error accumulated on a transfer path side of the 0-system;

a 1-system holding unit configured to hold a 1-system correction value indicating a time error accumulated on a transfer path side of the 1-system;

a 0-system detection unit configured to detect a failure in the transfer path of the 0-system;

a 1-system detection unit configured to detect a failure in the transfer path of the 1-system;

a 0-system correction unit configured to perform correction when a failure is detected by subtracting the 0-system correction value from the UTC having the time error accumulated on the transfer path side of the 0-system;

a 1-system correction unit configured to perform correction when a failure is detected by subtracting the 1-system correction value from the UTC having the time error accumulated on the transfer path side of the I-system;

a 0-system switching unit configured to perform switching to stop a transfer, to the one or more of the second plurality of BC apparatuses downstream of the specific BC apparatus, of time information on the transfer path of the 0-system when the 0-system detection unit detects a failure, and start a transfer, to the one or more of a second plurality of BC apparatuses downstream of the specific BC apparatus, of time information on the transfer path of the 0-system when the 1-system detection unit detects a failure; and a 1-system switching unit configured to perform switching to start a transfer, to the one or more of the second plurality of BC apparatuses downstream of the specific BC apparatus, of time information on the transfer path of the -system when the 1-system detection unit detects a failure, and stop a transfer, to the one or more of the second plurality of BC apparatuses downstream of the specific BC apparatus, of time information on the transfer path of the 1-system when the 1-system detection unit detects a failure.

6. The time synchronization apparatus according to claim 5, wherein the 0-system detection unit is configured to detect restoration of a failure in the transfer path of the 0-system;

the 1-system detection unit is configured to detect restoration of a failure in the transfer path of the 1-system;

the 0-system switching unit is configured to perform a process of switching back to the transfer path of the 0-system when the restoration of the transfer path of the 0-system is detected; and the 1-system switching unit is configured to perform a process of switching back to the transfer path of the 1-system when the restoration of the transfer path of the 1-system is detected.

7. The time synchronization apparatus according to claim 5, wherein an output side of the specific BC apparatus is connected to time information transfer paths of at least two systems of a 0-system and a 1-system;
when the 0-system detection unit detects a failure, the 0-system switching unit is configured to stop the transfer of time information on the transfer path of the 0-system and the 1-system switching unit is configured to perform switching such that the UTC of the transfer path of the 1-system is transferred to the transfer paths of the two systems on the output side of the specific BC apparatus; and
when the 1-system detection unit detects a failure, the 1-system switching unit is configured to stop the transfer of time information on the transfer path of the 1-system and the 0-system switching unit is configured to perform switching such that the UTC of the transfer path of the 0-system is transferred to the transfer paths of the two systems on the output side of the specific BC apparatus.

8. A time synchronization method executed by a time synchronization apparatus for performing time synchronization by transferring UTC transmitted from a GM apparatus, which receives the UTC as time information, via a first plurality of Boundary Clock (BC) apparatuses connected by a transfer path and correcting time of each of one or more of the first plurality of BC apparatuses to time of the GM apparatus,
the time synchronization apparatus being mounted on a specific BC apparatus, among the first plurality of BC apparatuses, having an input side to which time information transfer paths of at least two systems of a 0-system and a 1-system having different transfer delays are connected, the time synchronization method comprising:
holding a 0-system correction value indicating a time error accumulated on a transfer path side of the 0-system holding a 1-system correction value indicating a time error accumulated on a transfer path side of the 1-system;
detecting a failure in the transfer path of the 0-system or the 1-system;
when a failure is detected, performing correction by subtracting the 0-system correction value or the 1-system correction value relating to a normal transfer path from the UTC having the time error accumulated on a normal transfer path side; and
switching to the normal transfer path side when a failure is detected such that the UTC obtained by the correction is transferred to one or more of a second plurality of BC apparatuses downstream of the specific BC apparatus.

9. The time synchronization method according to claim 8 further comprising:
detecting restoration of a failure of the transfer path of the 0-system or the 1-system;
performing correction by subtracting the 0-system correction value or the 1-system correction value relating to a restored transfer path from the UTC having the time error accumulated on the transfer path side for which restoration is detected; and
performing a process of switching back to the transfer path for which the restoration is detected such that the UTC obtained by the correction is transferred.

10. The time synchronization method according to claim 8 further comprising:
detecting, in a case where switching to the normal transfer path is performed when a failure is detected, an occurrence of a jump in time on the transfer path after switching due to a time error; and
performing, in a case where a jump in time is detected, a process of reducing a time error of the UTC transferred on a transfer path after switching within a predetermined time such that the jump in time is suppressed.

11. The time synchronization method according to claim 8, wherein an output side of the specific BC apparatus is connected to time information transfer paths of at least two systems of a 0-system and a 1-system, the time synchronization method further comprising:
performing switching when a failure is detected such that the UTC obtained by the correction is transferred to the transfer paths of the two systems on the output side of the specific BC apparatus.

* * * * *